US012374511B2

(12) United States Patent
Tsai et al.

(10) Patent No.: US 12,374,511 B2
(45) Date of Patent: Jul. 29, 2025

(54) KEYCAP

(71) Applicant: Primax Electronics Ltd., Taipei (TW)

(72) Inventors: Lei-Lung Tsai, Taipei (TW); Sheng-Fan Chang, Taipei (TW); Chang-Huan Shen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 224 days.

(21) Appl. No.: 18/124,522

(22) Filed: Mar. 21, 2023

(65) Prior Publication Data

US 2024/0242902 A1 Jul. 18, 2024

(30) Foreign Application Priority Data

Jan. 16, 2023 (TW) ................................ 112101888

(51) Int. Cl.
*H01H 13/04* (2006.01)
*H01H 11/00* (2006.01)
*H01H 13/14* (2006.01)

(52) U.S. Cl.
CPC ............ *H01H 13/04* (2013.01); *H01H 11/00* (2013.01); *H01H 13/14* (2013.01)

(58) Field of Classification Search
CPC ........ H01H 13/14; H01H 11/00; H01H 13/20; H01H 13/07; H01H 2229/042; H01H 2233/014; H01H 2233/07; H01H 2233/072; H01H 2233/074; H01H 2233/016; H01H 13/04; H01H 3/12; H01H 13/705; H01H 13/70
See application file for complete search history.

(56) References Cited

U.S. PATENT DOCUMENTS

2017/0178841 A1* 6/2017 Hsu ........................ H01H 11/00
2017/0330709 A1* 11/2017 Huang ..................... H01H 1/54

* cited by examiner

*Primary Examiner* — Renee S Luebke
*Assistant Examiner* — Robert M Schmitz
(74) *Attorney, Agent, or Firm* — KIRTON McCONKIE; Evan R. Witt

(57) ABSTRACT

A keycap includes a lower plate, a first magnetic element, an upper cover and a second magnetic element. The lower plate has two first engaging portions, which are respectively disposed on two opposite sides of an upper surface of the lower plate. The first magnetic element is fixed on the lower plate. The upper cover is configured to be detachably assembled on the lower plate, in which the upper cover has two second engaging portions respectively disposed on two opposite sides of an inner top surface of the upper cover and respectively corresponding to the two first engaging portions. The second magnetic element is fixed on the inner top surface of the upper cover, and is configured to magnetically attract the first magnetic element.

9 Claims, 6 Drawing Sheets

KEYCAP

FIELD OF THE INVENTION

The present disclosure relates to a keycap, in particular to a keycap including a lower plate and an upper cover configured to be detachably assembled on the lower plate.

BACKGROUND OF THE INVENTION

Keycaps of key structures of an existing keyboard device cannot be replaced. If the user wants to replace the keycaps with other keycaps (e.g., keycaps with different appearances), the entire keyboard device must be replaced, which is very inconvenient.

SUMMARY OF THE INVENTION

The present disclosure provides a keycap, which includes a lower plate, a first magnetic element, an upper cover and a second magnetic element. The lower plate has two first engaging portions, which are respectively disposed on two opposite sides of an upper surface of the lower plate. The first magnetic element is fixed on the lower plate. The upper cover is configured to be detachably assembled on the lower plate, in which the upper cover has two second engaging portions respectively disposed on two opposite sides of an inner top surface of the upper cover and respectively corresponding to the two first engaging portions. The second magnetic element is fixed on the inner top surface of the upper cover, and is configured to magnetically attract the first magnetic element.

In some embodiments of the present disclosure, the two first engaging portions are complementary to the two second engaging portions, respectively.

In some embodiments of the present disclosure, the two first engaging portions are two protrusions, and the two second engaging portions are two recesses, and after the upper cover is assembled on the lower plate, the two recesses accommodate the two protrusions, respectively.

In some embodiments of the present disclosure, at least one of the two first engaging portions has a first sloping surface, and the second engaging portion corresponding to the at least one of the two first engaging portions has a second sloping surface corresponding to the first sloping surface.

In some embodiments of the present disclosure, the lower plate further has four connecting portions disposed on a lower surface of the lower plate, and the four connecting portions are configured to connect four portions of a scissor-type connecting elements, respectively.

In some embodiments of the present disclosure, the upper cover further has four positioning portions disposed on the inner top surface of the upper cover, and the four positioning portions are configured to fix the second magnetic element on the inner top surface of the upper cover.

In some embodiments of the present disclosure, the first magnetic element has four openings respectively corresponding to the four positioning portions.

In some embodiments of the present disclosure, the first magnetic element is fixed on the lower plate through an adhesive layer.

In some embodiments of the present disclosure, the lower plate further has a recess portion configured to accommodate the first magnetic element.

In some embodiments of the present disclosure, the first magnetic element has a plurality of hot-melting holes through the first magnetic element, and the lower plate further has a plurality of hot-melting columns disposed in the recess portion and respectively passing through the hot-melting holes.

The present disclosure further provides a tool for disassembling the upper cover of the above-mentioned keycap, which includes a handheld portion and a magnetic attraction portion. The magnetic attraction portion is disposed on a bottom surface of the handheld portion and is configured to magnetically attract the second magnetic element.

In some embodiments of the present disclosure, the tool further includes two buckling portions respectively connected to two opposite sides of the bottom surface of the handheld portion and configured to respectively buckle two opposite sides of the upper cover.

BRIEF DESCRIPTION OF THE DRAWINGS

Aspects of the present disclosure are best understood from the following embodiments, read in conjunction with the accompanying drawings. It should be understood, however, that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
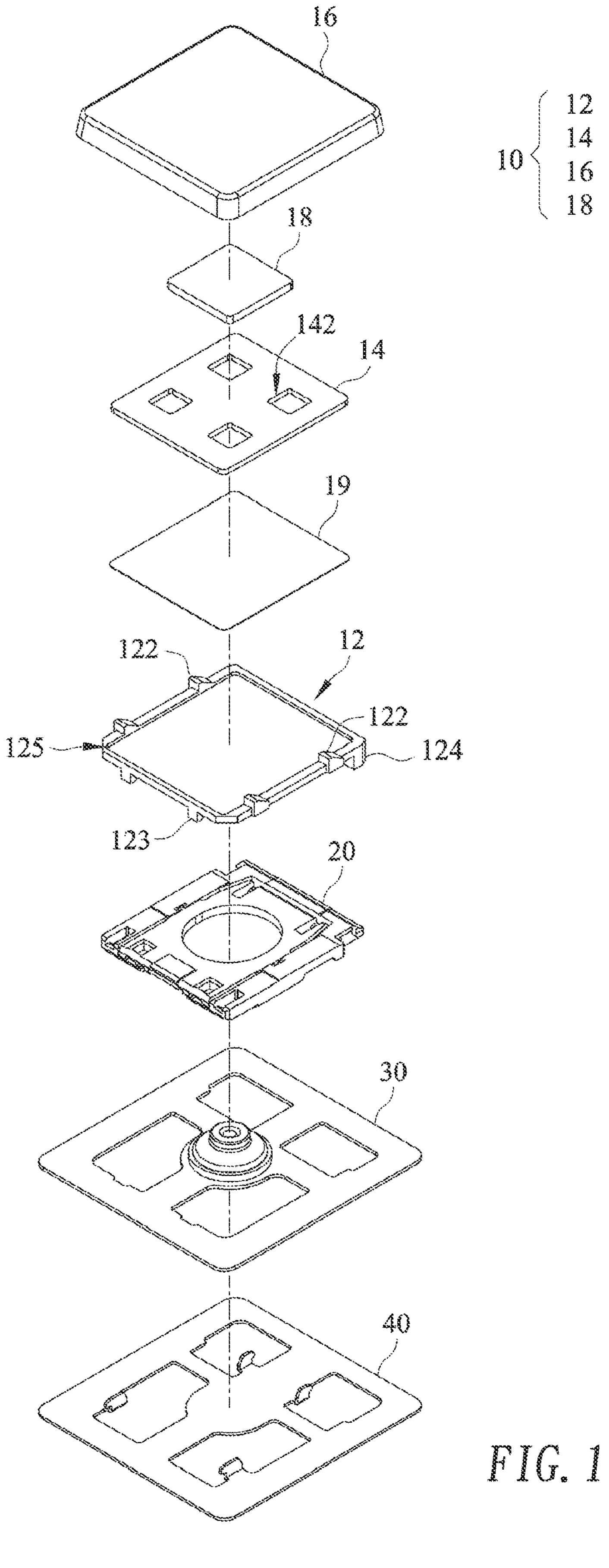
FIG. 1 is a top perspective exploded schematic diagram of a key structure according to an embodiment of the present invention.

The advantages and features of the present disclosure and the method for achieving the same will be described in more detail with reference to exemplary embodiments and the accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." In addition, the spatially relative descriptions used herein should be interpreted the same.

As described in the related art, the keycaps of the key structures of the existing keyboard device cannot be replaced. If the user wants to replace the keycaps with other keycaps (e.g., keycaps with different appearances), the entire keyboard device must be replaced, which is very inconvenient. Accordingly, the present invention provides a keycap, which includes a lower plate and an upper cover, and the user can easily disassemble the upper cover from the lower plate and assemble the upper cover or another upper cover on the lower plate, that is, the user can replace the upper cover of the keycap at will, which is very convenient. Various embodiments of the keycap of the present invention will be described in detail below.

FIG. 1 is a top perspective exploded schematic diagram of a key structure according to an embodiment of the present invention. In some embodiments, as shown in FIG. 1, the key structure includes a keycap 10, a scissor-type connecting element 20, a membrane circuit board 30 and a base plate 40, and the membrane circuit board 30 and the base plate 40 are located beneath the scissor-type connecting element 20, and the scissor-type connecting element 20 is located beneath the keycap 10. In some embodiments, the key structure further includes an elastic element (not marked) interposed between the keycap 10 and the membrane circuit board 30.

Figure 2:
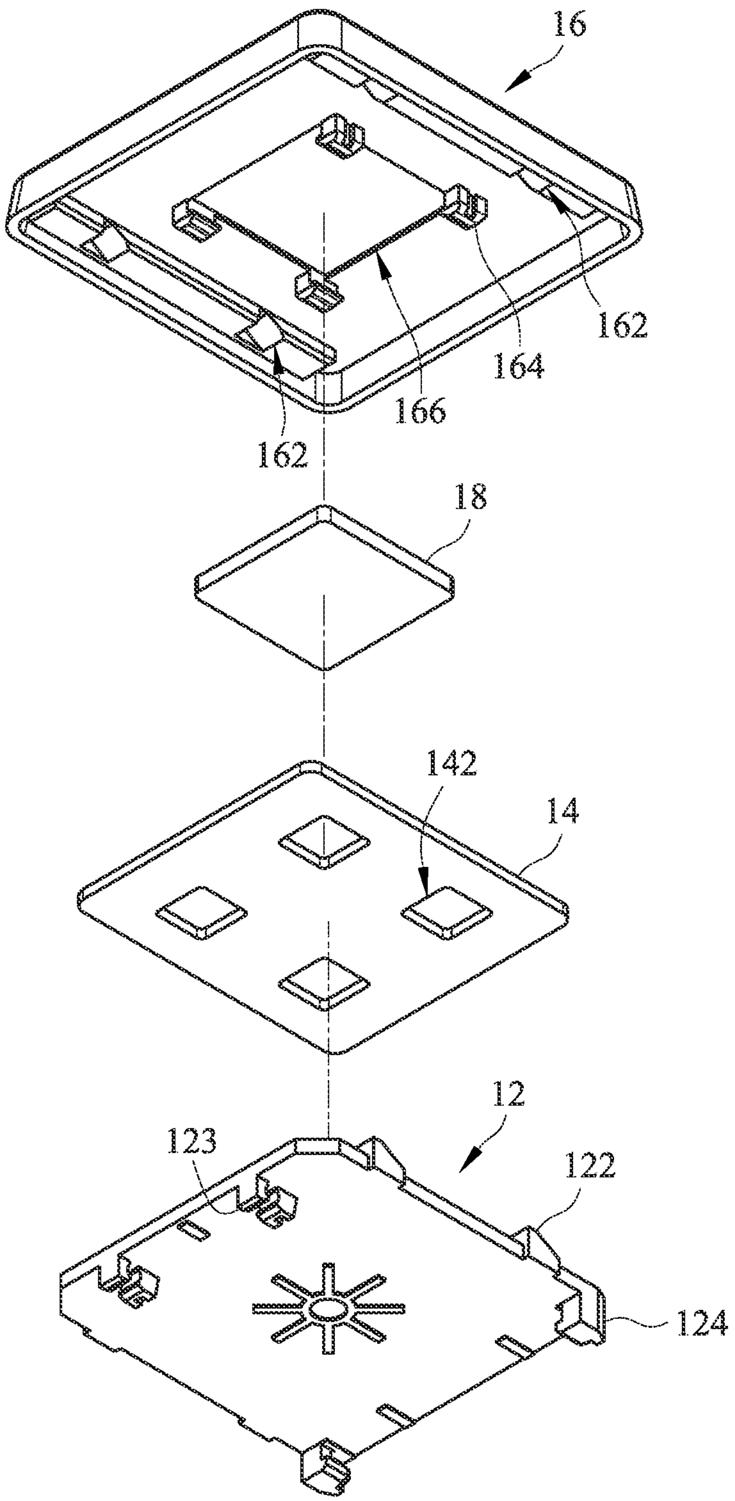
FIG. 2 is a bottom perspective exploded schematic diagram of a keycap of FIG. 1.

FIG. 2 is a bottom perspective exploded schematic diagram of a keycap of FIG. 1. Referring to FIGS. 1 and 2, the keycap 10 includes a lower plate 12, a first magnetic element 14, an upper cover 16 and a second magnetic element 18. In some embodiments, as shown in FIG. 2, the lower plate 12 has four connecting portions (e.g., two hook portions 123 and two slide grooves 124) disposed on a lower surface of the lower plate 12, which are configured to respectively connect four portions of the scissor-type connecting element 20 shown in FIG. 1. In some embodiments, as shown in FIG. 1, the base plate 40 has four hook parts (not marked), which are configured to respectively connect to other four portions of the scissor-type connecting element 20. As such, it can be ensured that the scissor-type connecting element 20 does not detach from the lower plate 12 of the keycap 10 and the base plate 40 when the key structure is in operation. However, the present invention is not limited to the above-mentioned embodiments, and the lower plate 12 may have connecting portions with other structures disposed on the lower surface of the lower plate 12 to cooperate with another component located beneath the lower plate 12.

Figure 3:
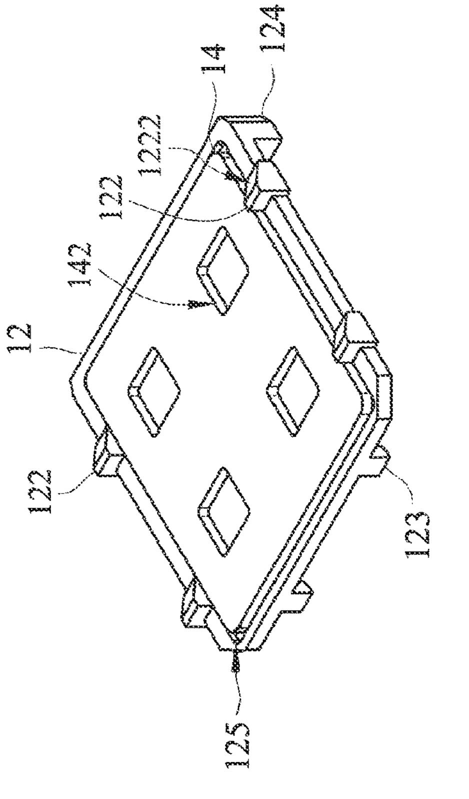
FIG. 3 is a top perspective schematic diagram of a lower plate and a first magnetic element in FIG. 2.

FIG. 3 is a top perspective schematic diagram of a lower plate and a first magnetic element in FIG. 2. As shown in FIGS. 1 to 3, the lower plate 12 has at least two first engaging portions 122 respectively disposed on two opposite sides of an upper surface of the lower plate 12. In some embodiments, the two first engaging portions 122 are two protrusions. In some embodiments, at least one of the two first engaging portions 122 has a first sloping surface 1222.

As shown in FIG. 3, the first magnetic element 14 is fixed on the lower plate 12. In some embodiments, the lower plate 12 further has a recess portion 125 configured to accommodate the first magnetic element 14. In some embodiments, a top view shape or a bottom view shape of the first magnetic element 14 is square, but it can also be another shape, such as circle, triangle, rectangle, hexagon or another suitable shape. In some embodiments, the first magnetic element 14 is made of steel plate tin electrolytic (SPTE) or another material that can be attracted by a magnet.

Figure 4:
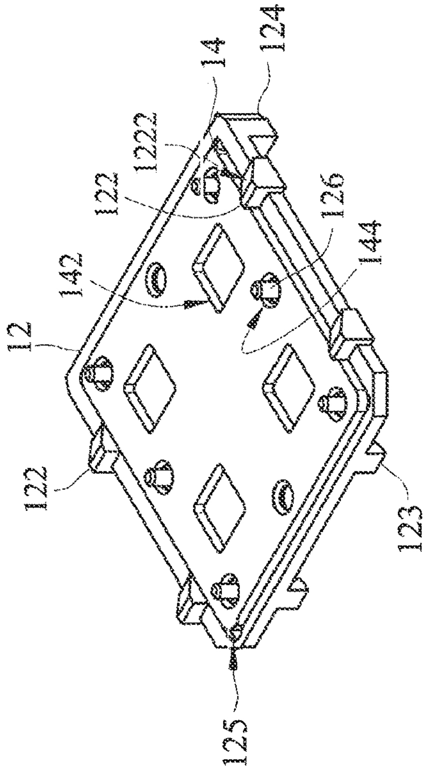
FIG. 4 is a top perspective schematic diagram of a lower plate and a first magnetic element according to another embodiment of the present invention.

The first magnetic element 14 may be fixed on the lower plate 12 in any manner. In some embodiments, as shown in FIG. 1, the first magnetic element 14 is fixed on the lower plate 12 through an adhesive layer 19. FIG. 4 is a top perspective schematic diagram of a lower plate and a first magnetic element according to another embodiment of the present invention. As shown in FIG. 4, the first magnetic element 14 is fixed on the lower plate 12 through a hot-melt process. In some embodiments, the first magnetic element 14 has a plurality of hot-melting holes 144 through the first magnetic element 14, and the lower plate 12 further has a plurality of hot-melting columns 126 disposed in the recess portion 125 (e.g., protruding upward from bottom of the recess portion 125) and respectively passing through the hot-melting holes 144. The hot-melting columns 126 are melted through a heating process and then cooled and formed to fix the first magnetic element 14 on the lower plate 12.

Figure 5:
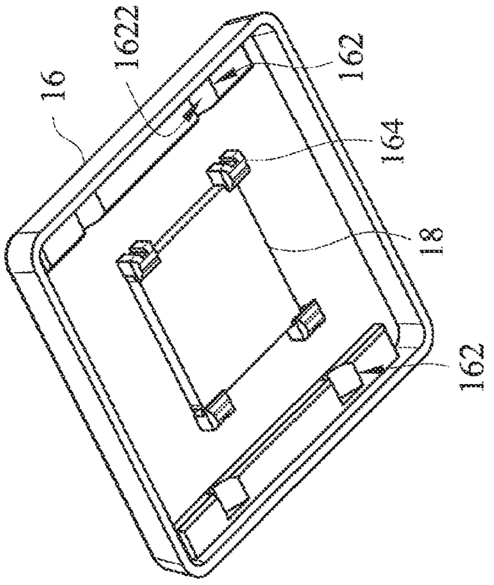
FIG. 5 is a bottom perspective schematic diagram of an upper cover and a second magnetic element in FIG. 2.

FIG. 5 is a bottom perspective schematic diagram of an upper cover and a second magnetic element in FIG. 2. The upper cover 16 shown in FIG. 5 is configured to be detachably assembled on the lower plate (e.g., the lower plate 12 shown in FIG. 3 or FIG. 4). As shown in FIGS. 2 and 5, the upper cover 16 has at least two second engaging portions 162 respectively disposed on two opposite sides of an inner top surface of the upper cover 16. The two second engaging portions 162 correspond (in position) to the two first engaging portions 122, respectively. In some embodiments, the two second engaging portions 162 are two recesses, and after the upper cover 16 is assembled on the lower plate 12, the two recesses accommodate the two protrusions, respectively. In some embodiments, the two first engaging portions 122 are complementary to the two second engaging portions 162, respectively, that is, a shape of the first engaging portion 122 substantially matches a shape of the second engaging portion 162. In some embodiments, the second engaging portion 162 corresponding to the at least one of the two first engaging portions 122 has a second sloping surface 1622 corresponding to the first sloping surface 1222.

As shown in FIG. 5, the second magnetic element 18 is fixed on the inner top surface of the upper cover 16 and is configured to magnetically attract the first magnetic element 14. In some embodiments, the second magnetic element 18 and the at least two second engaging portions 162 are separated from each other. In some embodiments, as shown in FIGS. 2 and 5, the upper cover 16 further has a recess portion 166 configured to accommodate the second magnetic element 18. In some embodiments, a top view shape or a bottom view shape of the second magnetic element 18 is a square, but it can also be another shape, such as circle, triangle, rectangle, hexagon or another suitable shape. In some embodiments, a material of the second magnetic element 18 is a magnet.

The second magnetic element 18 may be fixed on the inner top surface of the upper cover 16 in any manner. In some embodiments, as shown in FIGS. 2 and 5, the upper cover 16 further has four positioning portions 164 disposed on the inner top surface of the upper cover 16, and the four positioning portions 164 are configured to fix the second magnetic element 18 on the inner top surface of upper cover 16. In some embodiments, as shown in FIGS. 1 to 4, the first magnetic element 14 has four openings 142 respectively corresponding to the four positioning portions 164, so that after the upper cover 16 is assembled on the lower plate 12, the four openings 142 can accommodate the four positioning portions 164, respectively.

Figure 6:
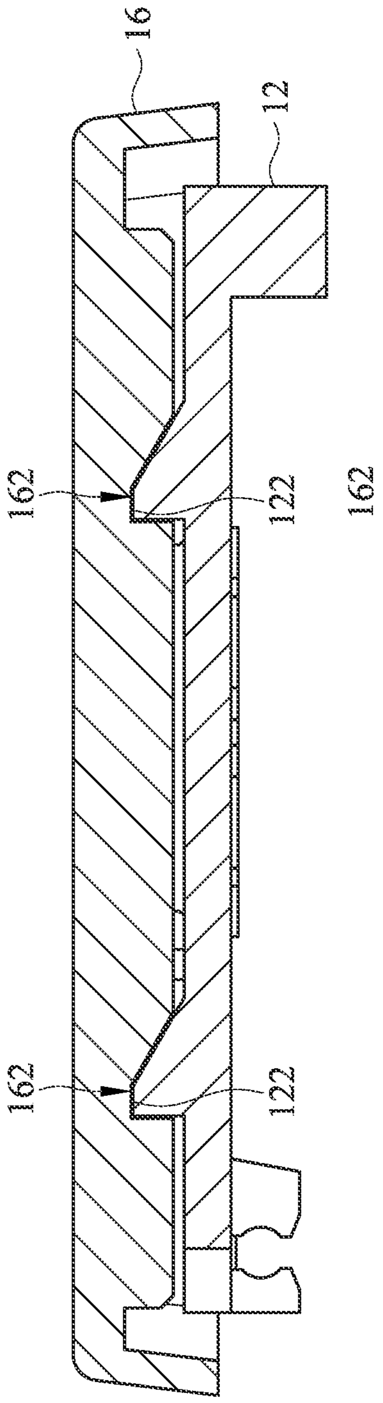
FIG. 6 is a schematic cross-sectional view after the upper cover of FIG. 5 is assembled on the lower plate of FIG. 3.
Figure 7:
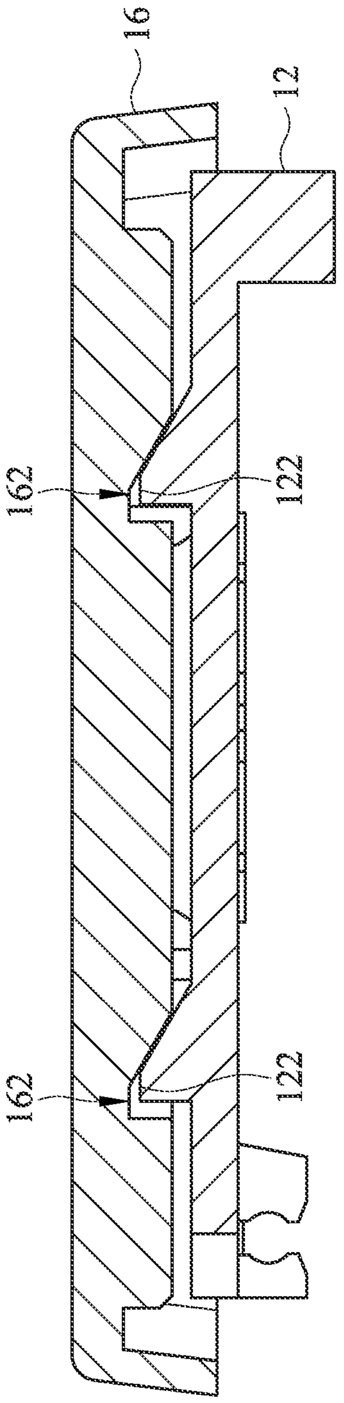
FIG. 7 is a schematic cross-sectional view of the lower plate and the upper cover after the upper cover of FIG. 6 slides.

FIG. 6 is a schematic cross-sectional view after the upper cover of FIG. 5 is assembled on the lower plate of FIG. 3. FIG. 7 is a schematic cross-sectional view of the lower plate and the upper cover after the upper cover of FIG. 6 slides. The assembly method of the upper cover 16 is described below. Please refer to FIGS. 7 and 6. First, the user places the upper cover 16 on the lower plate 12, and makes the second engaging portions 162 (i.e., the recesses) substantially align with the first engaging portions 122 (i.e., the protrusions), respectively, and the upper cover 16 is temporarily fixed on the lower plate 12 through the magnetic attraction force between the second magnetic element 18 shown in FIG. 5 and the first magnetic element 14 shown in FIG. 3.

The disassembly method of the upper cover 16 is described below. Please refer to FIGS. 6 and 7, the user can push the upper cover 16 from right to left, so that the second engaging portions 162 (i.e., the recesses) leave the first engaging portions 122 (i.e., the protrusions), respectively, and the second magnetic element 18 shown in FIG. 5 leaves the first magnetic element 14 shown in FIG. 3, and thus the upper cover 16 can be took off.

Figure 8:
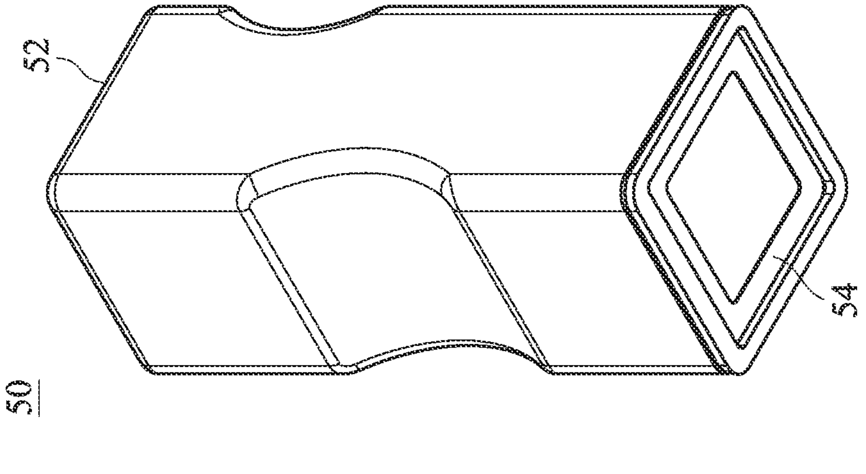
FIG. 8 is a bottom perspective schematic diagram of a tool for disassembling an upper cover of a keycap according to an embodiment of the present invention.

However, the upper cover 16 of the present invention can also be disassembled in another way such as using a tool. FIG. 8 is a bottom perspective schematic diagram of a tool for disassembling an upper cover of a keycap according to an embodiment of the present invention. As shown in FIG. 8, the tool 50 includes a handheld portion 52 and a magnetic attraction portion 54. The magnetic attraction portion 54 is disposed on a bottom surface of the handheld portion 52 and is configured to magnetically attract the second magnetic element 18 shown in FIG. 2. In some embodiments, the magnetic force of the magnetic attraction portion 54 is greater than the magnetic force of the second magnetic element 18.

Figure 9:
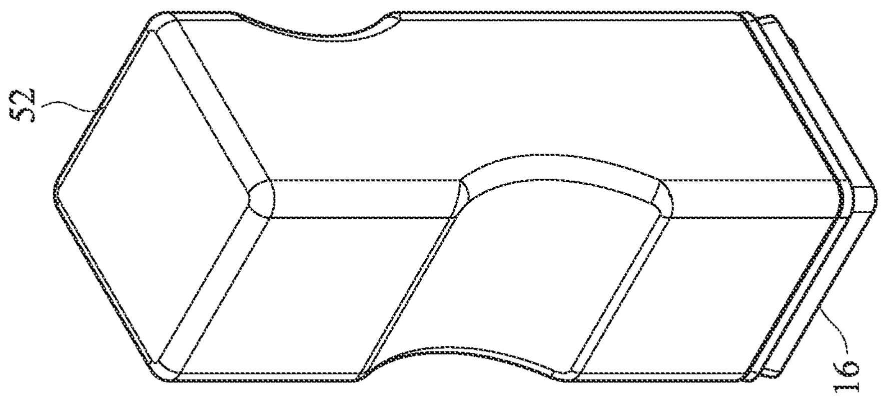
FIG. 9 is a top perspective schematic diagram of the tool of FIG. 8 placed on the keycap of FIG. 2.

FIG. 9 is a top perspective schematic diagram of the tool of FIG. 8 placed on the keycap of FIG. 2. The disassembly method of the upper cover 16 is described below. Please refer to FIGS. 8 and 9, the user aligns and places the handheld portion 52 of the tool 50 on the upper cover 16 to make the magnetic attraction portion 54 magnetically attract the second magnetic element beneath the upper cover 16, and then moves the tool 50 up or lift one side of tool 50 to take off the upper cover 16.

Figure 10:
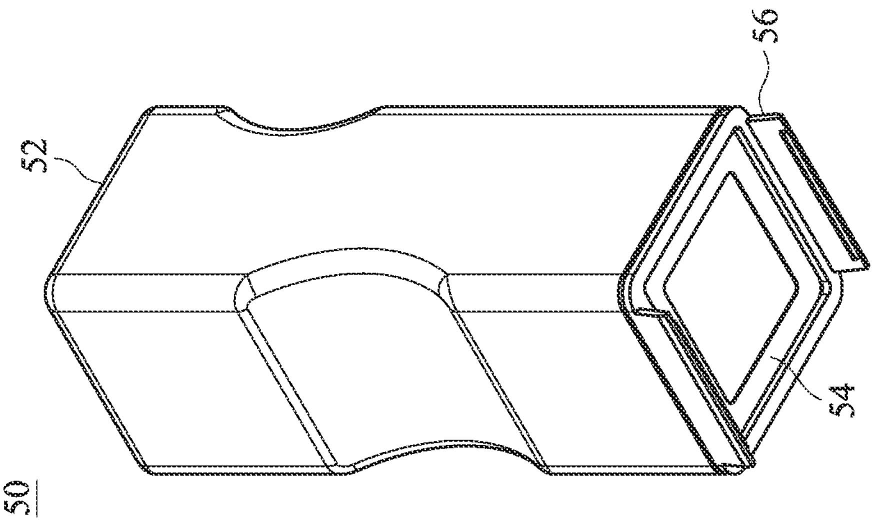
FIG. 10 is a bottom perspective schematic diagram of a tool for disassembling an upper cover of a keycap according to another embodiment of the present invention.

However, the present invention is not limited to the above-described embodiments. FIG. 10 is a bottom perspective schematic diagram of a tool for disassembling an upper cover of a keycap according to another embodiment of the present invention. The difference between the embodiment of FIG. 10 and the embodiment of FIG. 8 is that the tool 50 of FIG. 10 further includes two buckling portions 56. The two buckling portions 56 are respectively connected to two opposite sides of the bottom surface of the handheld portion 52 and are configured to respectively buckle two opposite sides of the upper cover (e.g., the upper cover 16 shown in FIG. 9). The two buckling portions 56 are used to assist the positioning of the tool 50 and the disassembly of the upper cover. In some embodiments, each of the buckling portions 56 has a protruding edge (not marked) disposed on its lower inner side to engage lower edges of the two opposite sides of the upper cover.

Figure 11:
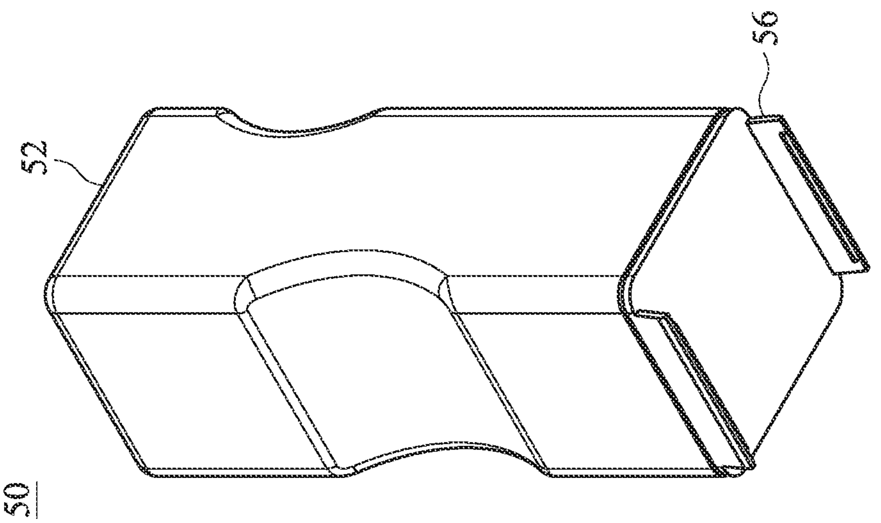
FIG. 11 is a bottom perspective schematic diagram of a tool for disassembling an upper cover of a keycap according to another embodiment of the present invention.

However, the present invention is not limited to the above-described embodiments. FIG. 11 is a bottom perspective schematic diagram of a tool for disassembling an upper cover of a keycap according to another embodiment of the present invention. The difference between the embodiment of FIG. 11 and the embodiment of FIG. 10 is that the tool 50 does not include a magnetic attraction portion. Two buckling portions 56 of the tool 50 are used to position the tool 50 and disassemble the upper cover.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not used to limit the scope of claims of the present disclosure.

What is claimed is:

1. A keycap, comprising:

a lower plate, having two first engaging portions respectively disposed on two opposite sides of an upper surface of the lower plate;

a first magnetic element, fixed on the lower plate;

an upper cover, configured to be detachably assembled on the lower plate, wherein the upper cover has two second engaging portions respectively disposed on two opposite sides of a bottom surface of the upper cover and respectively corresponding to the two first engaging portions, and at least one of the two first engaging portions has a first sloping surface, and the second engaging portion corresponding to the at least one of the two first engaging portions has a second sloping surface corresponding to the first sloping surface; and a second magnetic element, fixed on the bottom surface of the upper cover and configured to magnetically attract the first magnetic element.

2. The keycap of claim 1, wherein the two first engaging portions are complementary to the two second engaging portions, respectively.

3. The keycap of claim 1, wherein the two first engaging portions are two protrusions, and the two second engaging portions are two recesses, and after the upper cover is assembled on the lower plate, the two recesses accommodate the two protrusions, respectively.

4. The keycap of claim 1, wherein the lower plate further has four connecting portions disposed on a lower surface of the lower plate, and the four connecting portions are configured to connect four portions of a scissor-type connecting elements, respectively.

5. The keycap of claim 1, wherein the upper cover further has four positioning portions disposed on the bottom surface of the upper cover, and the four positioning portions are configured to fix the second magnetic element on the bottom surface of the upper cover.

6. The keycap of claim 5, wherein the first magnetic element has four openings respectively corresponding to the four positioning portions.

7. The keycap of claim 1, wherein the first magnetic element is fixed on the lower plate through an adhesive layer.

8. The keycap of claim 1, wherein the lower plate further has a recess portion configured to accommodate the first magnetic element.

9. The keycap of claim 8, wherein the first magnetic element has a plurality of hot-melting holes through the first magnetic element, and the lower plate further has a plurality of hot-melting columns disposed in the recess portion and respectively passing through the hot-melting holes.

* * * * *